(12) United States Patent
Gobena et al.

(10) Patent No.: US 10,274,984 B2
(45) Date of Patent: Apr. 30, 2019

(54) NETWORK ENERGY DISTRIBUTION

(71) Applicant: Cisco Technology, Inc., San Jose, CA (US)

(72) Inventors: Yeneneh Gobena, Cary, NC (US); Hazim Hashim Dahir, Raleigh, NC (US); Carlos M. Pignataro, Raleigh, NC (US); Charles Calvin Byers, Wheaton, IL (US)

(73) Assignee: Cisco Technology, Inc., San Jose, CA (US)

( * ) Notice: Subject to any disclaimer, the term of this patent is extended or adjusted under 35 U.S.C. 154(b) by 172 days.

(21) Appl. No.: 15/351,777

(22) Filed: Nov. 15, 2016

(65) Prior Publication Data

US 2018/0136683 A1    May 17, 2018

(51) Int. Cl.
*G06F 19/00* (2018.01)
*G05F 1/66* (2006.01)
*G06N 7/00* (2006.01)

(52) U.S. Cl.
CPC ............ *G05F 1/66* (2013.01); *G06N 7/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,565,759 A * | 10/1996 | Dunstan | ................ | H01M 10/44 320/135 |
| 5,914,585 A * | 6/1999 | Grabon | .................. | G06F 1/163 307/29 |
| 5,963,457 A * | 10/1999 | Kanoi | ....................... | H02J 3/00 340/870.03 |
| 2005/0027465 A1* | 2/2005 | Pozsgay | ................ | H02J 7/0052 702/63 |
| 2010/0223480 A1* | 9/2010 | Fratti | ....................... | G06F 1/266 713/300 |
| 2010/0292853 A1* | 11/2010 | McDonnell | ............... | H02J 3/34 700/287 |
| 2011/0016333 A1* | 1/2011 | Scott | ....................... | G06F 1/266 713/300 |
| 2013/0290739 A1* | 10/2013 | Khoo | ...................... | G06F 1/189 713/300 |
| 2014/0091623 A1* | 4/2014 | Shippy | .................. | H02J 7/0019 307/31 |

* cited by examiner

*Primary Examiner* — Kidest Bahta
(74) *Attorney, Agent, or Firm* — Behmke Innovation Group LLC; James Behmke; Stephen D. LeBarron (57) ABSTRACT

In one embodiment, a method includes receiving, from a first resource of a plurality of resources connected by an energy network, data indicative of a current amount of energy stored by the first resource at a current time. The method includes determining, based on the data indicative of the current amount of energy stored by the first resource at the current time, a predicted amount of energy to be stored by the first resource at a later time. The method includes determining, based on the predicted amount of energy to be stored by the first resource at the later time, that the first resource is to receive energy. The method includes, in response to determining that the first resource is to receive energy, selecting a second resource of the plurality of resources to transmit energy to the first resource. The method includes sending, to the second resource, instructions to transmit energy to the first resource.

20 Claims, 4 Drawing Sheets

NETWORK ENERGY DISTRIBUTION

TECHNICAL FIELD

The present disclosure relates generally to energy distribution systems, and in particular, to systems, methods and apparatuses for distributing energy among resources of a network.

BACKGROUND

The ongoing development, maintenance, and expansion of distributed networks involve an increasing number of devices consuming various amounts of energy. Distributing energy across the devices of the network can be performed to achieve a variety of goals. However, it can be challenging to optimize energy distribution to achieve these goals in the face of real-world variability and uncertainty.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for distributing energy among resource of a network. For example, in some implementations, a method includes receiving, from a first resource of a plurality of resources connected by an energy network, data indicative of a current amount of energy stored by the first resource at a current time. The method includes determining, based on the data indicative of the current amount of energy stored by the first resource at the current time, a predicted amount of energy to be stored by the first resource at a later time. The method includes determining, based on the predicted amount of energy to be stored by the first resource at the later time, that the first resource is to receive energy. The method includes, in response to determining that the first resource is to receive energy, selecting a second resource of the plurality of resources to transmit energy to the first resource. The method includes sending, to the second resource, instructions to transmit energy to the first resource.

Example Embodiments

Various resources of a network can produce and consume energy at various rates at various times. As an example, a network of devices in an Internet of Things (IoT) environment can include a number of sensors with long range, long battery life, small form factor, small computational ability, low storage, and low cost. Battery life is often expected to be multiple years at a low cost point. However, some sensors will transmit data sporadically while others transmit often, if not constantly. A sensor that transmits data more frequently may use more energy than a sensor that transmit less frequently. Accordingly, in various implementations described below, energy is distributed among resources in a network.

Thus, in various implementations, resources in the network are continually provided with energy to increase sensor longevity and communications. Accordingly, there is a reduced cost associated with replacement of millions of permanent sensors or their internal batteries. Likewise, there is a reduced cost associated with powering sensors in a remote area.

Distributing energy among resources in the network mitigates variation in energy generated by the resources, such as variations in solar energy generation from multiple days of bad weather or other energy harvesting sources. In various implementations, energy is distributed based on multiple parameters beyond the amount of energy stored by the resource (e.g., a low energy status or battery charge level). In various implementations, the path by which energy is distributed to a resource is determined based on multiple parameters.

Figure 1:
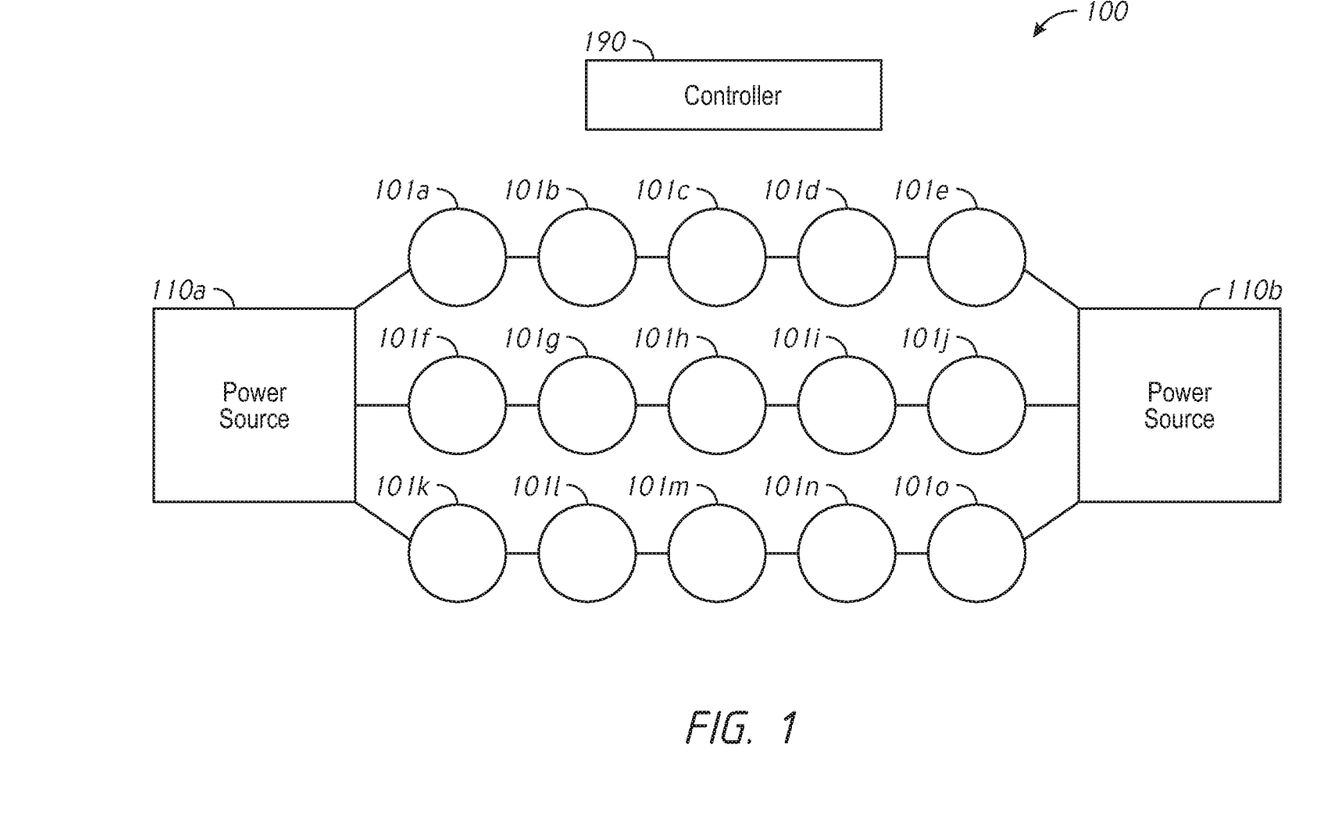
FIG. 1 is a functional block diagram of network environment in accordance with some implementations.

FIG. 1 is a functional block diagram of network environment 100 in accordance with some implementations. The network environment 100 includes a number of resources 101a-101O that can transmit and receive energy via a number of energy links forming an energy network. In various implementations, one or more of the energy links are bidirectional such that energy can be transmitted in either direction over the energy link. Energy can be transmitted (and received) via a number of different wired or wireless options, including, for example, metallic connections, induction, energy over RF (e.g., energy over Wi-Fi), or energy over light beams. The resources 101a-101O can also transmit data to and receive data from a controller 190 via a number of wired or wireless data links (not shown) forming a data network. In various implementations, the energy network is separate from, overlapping, or coextensive with the data network. For example, the energy network and data network can include PoE (Power over Ethernet) or USB (Universal Serial Bus) links. The network environment 100 includes one or more power sources 110a-110b that provide power to the resources 101a-101o over time and, thus, provide energy to the resources 101a-101o.

Figure 2:
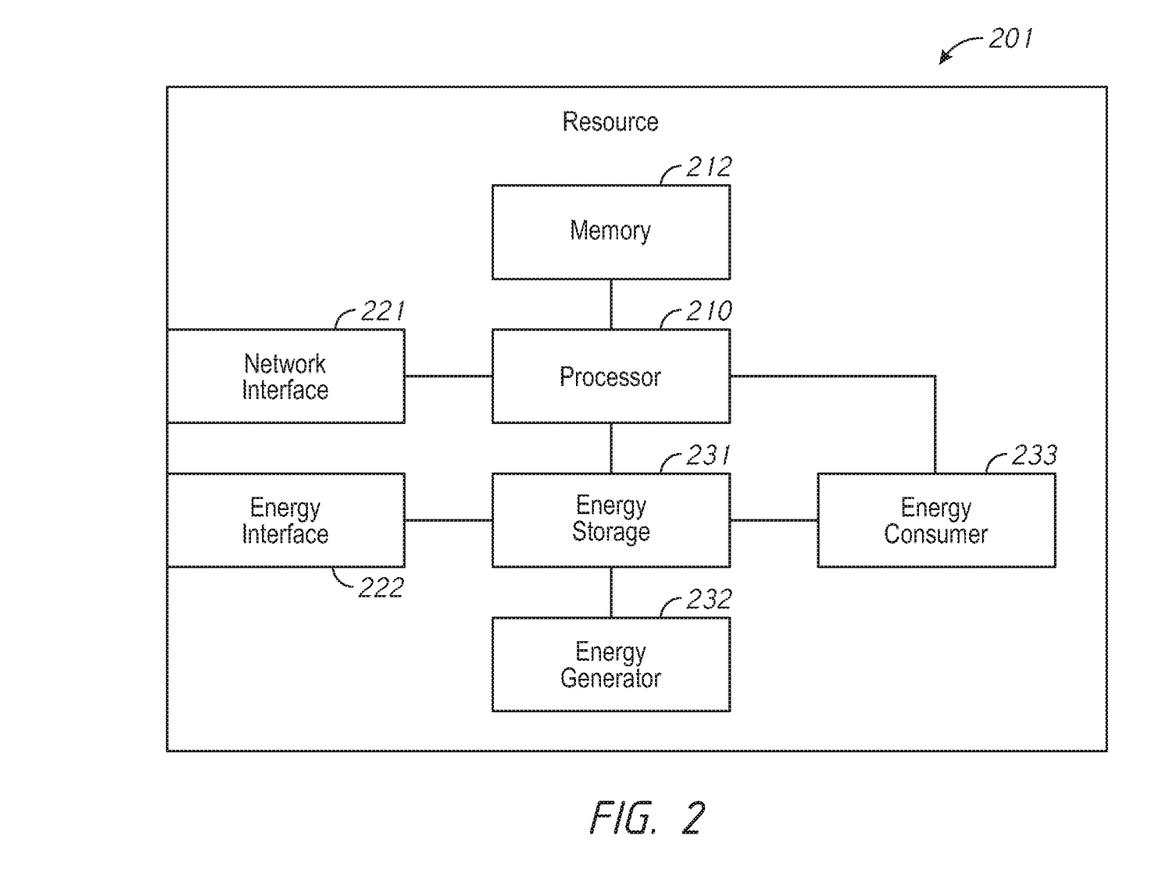
FIG. 2 illustrates a functional block diagram of a resource in accordance with some implementations.

FIG. 2 illustrates a functional block diagram of a resource 201 in accordance with some implementations. The resource 201 can represent any of the resources 101a-101o of FIG. 1. The resource 201 includes a processor 210 and a memory 212. In various implementations, the processor 210 and the memory 212 can be integrated as a single unit. The resource 201 includes one or more network interfaces 221 that transmit data from the processor 210 and receives data to the processor 210. The resource 201 includes an energy storage 231 that stores energy for use within the resource or for transmission to other resources in the network. The energy storage 231 can be, for example, one or more rechargeable batteries. The resource 201 includes an energy generator 233 that generates energy that is stored in the energy storage 231. The energy generator 233 can be, for example, one or more solar panels, turbines, or fuel cells.

The resource 201 includes an energy consumer 232 that consumes energy from the energy storage 231 and, in some embodiments, generates data to the processor 210. In various implementations, the energy consumer 232 includes one or more environmental sensors. Thus, the resource 201 can operate as a sensor and the network environment 100 of FIG. 1 can include a sensor network. In various implementations, the energy consumer 232 includes a light source. Thus, the resource 201 can operate as a streetlight and the network environment 100 of FIG. 1 can include a lighting network. In various implementations, the energy consumer 232 can be the processor 210 itself (which can include one or more processors). Thus, the resource 201 can operate as a fog computing node and the network environment 100 of FIG. 1 can be a fog computing network. In various implementations, the energy consumer 232 can include an actuator. Thus, the resource 201 can operate as a robotic manufacturing unit and the network environment 100 of FIG. 1 can be an automated assembly line. It is to be appreciated that the energy consumer 232 can include other energy drains, the resource 201 can operate as other types of devices, and the network environment 100 of FIG. 1 can be other types of networks.

In various implementations, the resource 201 may lack an energy consumer 232 and/or an energy generator 233. The resource 201 includes an energy interface 222 that transmits energy from and receives energy to the energy storage 231. In various implementations, the network interface 221 and the energy interface 222 are integrated into a single unit, e.g., a PoE or USB interface. In various implementations, the network interface 221 and energy interface 222 are separate units.

Referring again to FIG. 1, the controller 190 controls the resources 101a-101o to distribute energy among the energy storages 231 of the resources 101a-101o. In particular, the controller 190 can transmit energy transmission instructions, e.g., via the data network, to various resources 101a-101o to transmit energy to others of the resources 101a-101o, e.g., via the energy network. The energy transmission instructions can be sent to a source resource and can include a destination resource identifier identifying which of the other resources 101a-101o the source resource is to transmit energy to, data indicative of a time to start transmitting the energy to the destination resource, data indicative of a time to end transmitting the energy to the destination resource, and data indicative of an amount of energy to transmit to the destination resource. The data indicative of the time to transmit the energy to the destination resource can indicate that energy is to be transmitted immediately, at a later time, or over a range of time. The data indicative of the amount of energy to transmit can be, for example, a total amount of energy (e.g., a value in kilowatt-hours) or an amount of power (e.g., a value in kilowatts) to be transmitted over the range of time.

The controller 190 can determine whether to transmit the energy transmission instructions, the content of the energy transmission instructions, and which source resources to transmit the energy transmission instructions to based on a number of metrics in order to achieve a number of different goals. In various implementations, the controller 190 distributes energy among the resources 101a-101o to minimize the number of energy consuming resources 101a-101o without energy to consume (e.g., to ensure continued operation of as many resources 101a-101o as possible for as long as possible). In various implementations, the controller 190 distributes energy in order to minimize the cost of energy consumed (e.g., the cost of energy from the power sources 110a-110b and/or the transmission loss in distributing energy over the energy network). To that end, the controller 190 receives, generates, and/or stores a variety of information regarding the resources 101a-101o and the power sources 110a-110b.

In various implementations, the controller 190 receives (e.g., via the data network) energy storage information from the resources 101a-101o. The energy storage information can include, for example, one or more of an amount of energy stored by the resource, an energy storage percentage level, a maximum energy storage capacity, or a maximum rate at which the resource can receive or transmit energy.

For example, in some embodiments, the controller 190 determines that the resource 101m has a battery level of 25% of its battery capacity whereas the resource 101l has a battery level of 90% of its battery capacity. Thus, the controller 190 sends instructions to the resource 101l to transmit energy amounting to 30% of its battery capacity to the resource 101m.

In various implementations, the controller 190 receives (e.g., via the data network) energy storage rate information from the resources 101a-101o. The energy storage rate information can include for example, an amount of power being consumed by the resource, an amount of power being generated by the resource, and/or a combination of the two (e.g., a rate of change in the amount of energy stored by the resource). In various implementations, the controller 190 can determine the energy storage rate information based on energy storage information received at various times. For example, if the controller 190 receives first energy storage information indicating that a resource has a first amount of energy stored at a first time and receives second energy storage information indicating that the resource has a second amount of energy stored at a second time, the controller 190 can determine a rate at which energy is being consumed and/or generated by the resource by dividing the difference between the first amount and the second amount by the difference between the first time and the second time.

For example, in some embodiments, the controller 190 determines that the resource 101b has a battery level of 50% of its battery capacity and is consuming energy amounting to 5% of its battery capacity every hour and the resource 101c has a battery level of 40% of its battery capacity and is producing energy amounting to 5% of its battery capacity every hour. Thus, even though the resource 101c has a lower battery level than the resource 101b, the controller 190 sends instructions to the resource 101c to transmit energy amounting to 20% of its battery capacity to the resource 101b.

In various implementations, the controller 190 can determine expected energy storage rate information for the resources for a current time or one or more future times based on energy storage rate information received or generated at past times. In some embodiments, the controller 190 employs machine-learning algorithms to generate expected energy storage rate information based on energy storage rate information received or generated for past times. In various implementations, the controller 190 can determine expected power consumption information indicative of an expected amount of power to be consumed by a resource at a current time or one or more future times and/or expected power generation information indicative of an expected amount of power to be generated by a resource at a current time or one or more future times.

For example, in some embodiments, the controller 190 determines that the resource 101g has a battery level of 50% of its battery capacity, is producing energy amounting to 10% of its battery capacity every hour, and is expected to soon begin consuming energy amounting 5% of its battery capacity every hour. For example, the resource 101g may be a streetlight that produces energy during the day (e.g., with one or more solar panels) but consumes energy during the night (e.g., with one or more light sources). The controller 190 determines that the resource 101f has a battery level of 40% of its battery capacity and is consuming energy amounting to 1% of its battery level every hour. For example, the resource 101f may be a low power surveillance video camera. Thus, even though the resource 101f has a lower battery level than the resource 101g and even though the resource 101f is consuming more power than the resource 101g, the controller 190 sends instructions to the resource 101f to transmit energy amounting to 20% of its battery capacity to the resource 101g. Without such a transfer, over 12 hours of night, the resource 101g will begin with a battery level of 50% and run out of energy after 10 hours, whereas the resource 101f will begin with a battery level of 40% and drop to 28%. With such a transfer, over 12 hours of night, the resource 101g will drop from a battery level of 80% to a battery level of 20% and the resource 101f will drop from a battery level of 20% to a battery level of 8%. Thus, both the resources 101f, 101g have energy for the 12 hours of night.

In various implementations, the controller 190 receives (e.g., via the data network) priority information regarding the resources 101a-101o. In some embodiments, distributing energy to some resources may be prioritized over distributing energy to other resources. For example, the resource 101h may be a streetlight at a busy intersection, whereas the resource 101i may be a streetlight along a side street. As another example, the resource 101h may be a fire alarm, whereas the resource 101i may be a pollution sensor. In various implementations, the priority information for a resource is based on criteria such as the participation of the resource in a life critical or mission critical service, the economic value of the services provided by the resource, or the cost of replacing the resource or reproducing any results lost as a result of the resource lacking energy. The controller 190 can determine that the resource 101h has a battery level of 30% of its battery capacity and a priority level of 4 and the resource 101i has a battery level of 25% of its battery capacity and a priority level of 2. Thus, even though the resource 101i has a lower battery level than the resource 101h, the controller 190 sends instructions to the resource 101i to transmit energy amounting to 15% of its battery capacity to the resource 101h.

In various implementations, the controller 190 accounts for the topology of the energy network in generating energy transmission instructions. For example, the controller 190 can determine that the resource 101b has a low battery level and is to receive additional energy. Based on the topology of the energy network and the associated costs of transmitting energy from various sources, the controller 190 can determine whether to instruct the resource 101a to transmit energy to the resource 101b, to instruct the resource 101c to transmit energy to the resource 101b, or to instruct other resources (e.g., the resource 101g) to transmit energy along the energy network to the resource 101b (e.g., via the resource 101h and the resource 101c). For example, the resource 101a can have a battery level of 25% of its battery capacity, the resource 101c can have a battery level of 10% of its battery capacity, and the resource 101g can have a battery level of 90% of its battery capacity. As a first option, the controller 190 instructs the resource 101a to transmit energy amounting to 10% of its battery capacity to the resource 101b. As a second option, the controller instructs the resource 101g to transmit energy amounting to 40% of its battery capacity to resource 101h, instructs the resource 101h to forward that energy to the resource 101c, and instructs the resource 101c to forward that energy to the resource 101b. If the cost of transmitting energy between resources is high (e.g., due to energy transmission loss), the first option may be preferable. If the cost of transmitting energy between resources is low, the second option may be preferable. The cost of transmitting energy between resources can be represented in a variety of ways, including a hop value indicating a number of resources traversed between the resources in the data network, a total distance (e.g., in kilometers) between resources traversed in the data network, or an energy transmission efficiency. For example, if 10% of energy is lost at each hop, the second option of transmitting energy amounting to 40% of the battery capacity of the resource 101g results in energy amounting to 29% of the battery capacity of the resource 101g reaching the resource 101b.

In various implementations, a resource can receive energy from multiple other resources. Thus, in some embodiments, the resource 101b can receive energy from both resource 101a and resource 101g (via the resource 101h and the resource 101c). Accordingly, in some embodiments, the controller 190 selects both the first option and the second option (possibly with different amounts of energy transmitted). With multiple resources providing energy to the resource 101b (via multiple paths), the resource 101b is charged faster.

In various implementations, a resource along a charging path (e.g., the resource 101c along the path between the resource 101g and the resource 101b) can retain some of the energy received. For example, the controller 190 can instruct the resource 101g to transmit energy amounting to 40% of its battery capacity to resource 101h, can instruct the resource 101h to transmit energy amounting to 40% of its battery capacity to resource 101c, and can instruct the resource 101c to transmit energy amounting to 30% of its battery capacity to resource 101b. Thus, the resource 101c retains energy amounting to 10% of its battery capacity and resource 101b receives energy amounting to 30% of its battery capacity.

In various implementations, the controller 190 receives (e.g., via the data network) energy cost information regarding the cost of drawing power from the power sources 110a-110b. In some embodiments, the costs of drawing power changes over time (e.g., is higher during peak energy usage times). Accordingly, the controller 190 can determine to draw power from the power sources 110*a*-110*b* at different times based on the energy cost information. For example, the controller 190 can determine that the resource 101*j* has a battery level of 50% of its battery capacity and is consuming energy amounting to 5% of its battery capacity every hour. If the cost of drawing power from the power source 110*b* is low, the controller 190 can instruct the resource 101*j* to draw power from the power source 110*b*. However, if the cost of drawing power from the power source 110*b* is high, the controller 190 can instruct the resource 101*j* to draw power from the power source 110*b* at a later time (e.g., after the peak energy usage time).

In various implementations, the controller 190 receives (e.g., via the data network) energy transmission restriction information regarding restrictions on transmitting energy between the resources. For example, in some embodiments, a resource may be restricted to receiving energy (and not transmitting energy), transmitting energy (and not receiving energy), transmitting only an amount of energy it has received, transmitting energy when above a threshold energy storage level, or other functions. For example, the controller 190 can determine that the resource 101*n* has a battery level of 25% of its battery capacity, the resource 101*m* has a battery level of 75% of its battery capacity, and the resource 101*o* has a battery level of 35% of its battery capacity. In some embodiments, the controller 190 can instruct the resource 101*m* to transmit energy amounting to 20% of its battery capacity to resource 101*n*. However, in some embodiments, the resource 101*m* may be restricted to transmitting energy only when its battery level is above 80% of its battery capacity. Thus, the controller 190 can, instead, instruct the resource 101*o* to transmit energy amounting to 10% of its battery capacity.

Figure 3:
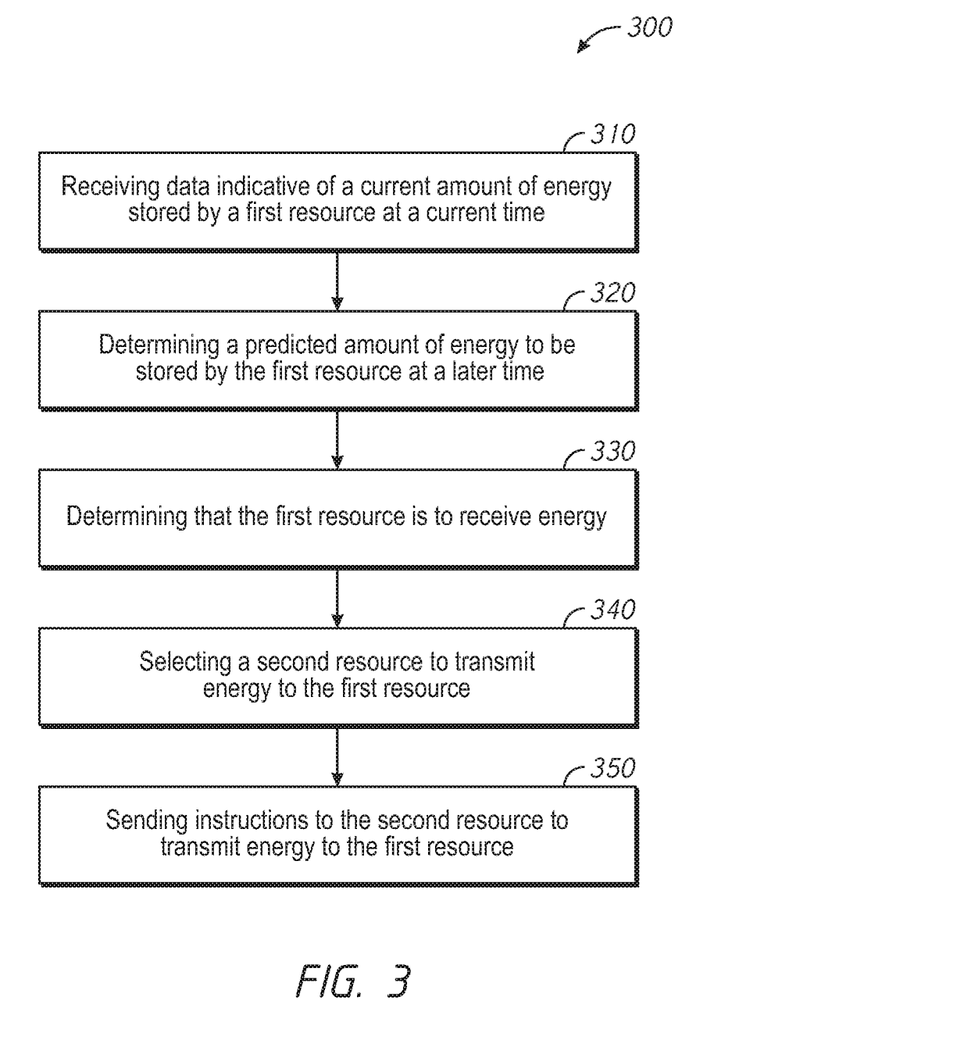
FIG. 3 is a flowchart representation of a method of distributing energy among resource of a network in accordance with some implementations.

FIG. 3 is a flowchart representation of a method 300 of distributing energy amongst resources in accordance with some implementations. In some implementations (and as detailed below as an example), the method 300 is performed by a controller (or a portion thereof), such as the controller 190 of FIG. 1. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes sending, to a second resource, instructions to transmit energy to a first resource based on a current amount of energy stored by the first resource at a current time and a predicted amount of energy to be stored by the first resource at a later time.

The method 300 beings, at block 310, with the controller receiving, from a first resource of a plurality of resources connected by an energy network, data indicative of a current amount of energy stored by the first resource at a current time. The data indicative of the current amount of energy can include a value indicative of a number of energy units (e.g., kilowatt-hours) stored by the resource or a percentage of maximum amount of energy that can be stored by the resource (e.g., a battery level). In various implementations, the controller can store, for each of the resources, data indicative of the maximum amount of energy that can be stored by the resource.

In various implementations, the controller receives data, from each of the resources, data regarding a current amount of energy stored by the resource (in addition to other data described above and further below). Thus, the controller can generate a network-wide view of the energy states of the resources, their criticality, and their simulated runtime and, based on this view, make globally optimized decisions to distribute energy throughout the network.

At block 320, the controller determines, based on the data indicative of the current amount of energy stored by the first resource at the current time, a predicted amount of energy to be stored by the first resource at a later time. To that end, in various implementations, the controller receives, from the first resource, data indicative of a current rate of change in the amount of energy stored by the first resource. The data indicative of the current rate of change in the amount of energy stored by the first resource can include data indicative of a rate of energy consumption, a rate of energy generation, or both.

For example, the controller can receive (at block 310) data indicating that the first resource has 10 energy units stored. The controller can also receive data indicating that the first resource is consuming 2 energy units an hour. Accordingly, the controller can determine (at block 320) that the first resource will have no energy stored in five hours.

In various implementations, the controller receives, from the first resource, data indicative of a past rate of change in the amount of energy stored by the first resource at a past time. In some embodiments, the controller receives the data at the past time as data indicative of a current rate of change in the amount of energy stored by the first resource. Further, the controller determines a predicted rate of change in the amount of energy stored by the first resource at a later time based on the data indicative of the past rate of change in the amount of energy. In various implementations, the controller determines (in block 320) the predicted amount of energy to be stored by the first resource at the later time based on the predicted rate of change in the amount of energy stored by the first resource.

For example, the controller can receive (at block 310) data indicating that the first resource has 10 energy units stored. The controller can also receive data indicating that the first resource is generating 1 energy unit an hour. However, the controller can further determine, based on historical power consumption/generation information (e.g., data indicative of one or more past rate of change in the amount of energy stored by the first resource at one or more past times), that the first resource will soon begin consuming 2 energy units an hour. Accordingly, the controller can determine (at block 320) that the first resource will have no energy stored in five hours.

In some embodiments, determining the predicted rate of change in the amount of energy stored by the first resource includes applying a machine-learning algorithm to at least the past rate of change in the amount of energy stored by the first resource at the past time. The machine-learning algorithm can also be applied to other past rates of change in the amount of energy stored by the first resource at other past times.

At block 330, the controller determines, based on the predicted amount of energy to be stored by the first resource at the later time, that the first resource is to receive energy. In various implementations, the controller determines an amount of energy that the first resource is to receive. In some embodiments, the controller determines that the first resource is to receive energy when the predicted amount of energy at the later time is zero or below a threshold. In various implementations, the controller determines that the first resource is to receive energy further based on a priority value associated with the first resource. Thus, in some embodiments, the controller determines that one resource, having a first priority value, is to receive energy when the predicted amount of energy at the later time is below a first threshold and determines that another resource, having a second priority value, is to receive energy when the predicted amount of energy at the later time is below a second threshold.

At block 340, the controller selects a second resource of the plurality of resources to transmit energy to the first resource. In various implementations, the controller receives, from the second resource, data indicative of a current amount of energy stored by the second resource at the current time and selects the second resource based on the data indicative of the current amount of energy stored by the second resource at the current time.

For example, the controller can receive data indicating that the second resource has 20 energy units stored and a third resource has 3 energy units stored. Accordingly, the controller can select the second resource because it has more energy stored.

In various implementations, the controller receives, from the second resource data indicative of a current rate of change in the amount of energy stored by the second resource at the current time and selects the second resource based on the data indicative of the current rate of change in the amount of energy stored by the second resource at the current time.

For example, the controller can receive data indicating that the second resource has 10 energy units stored and is generating 2 energy units per hour and can receive data indicating that a third resource has 20 energy units stored and is consuming 5 energy units per hour. Accordingly, the controller can select the second resource because it is currently generating energy. Because the resources can generate energy, in some embodiments, the controller selects the second resource even though the current amount of energy stored by the second resource at the current time is less than the current amount of energy stored by the first resource at the current time.

In various implementations, the controller receives data indicative of a past rate of change in the amount of energy stored by the second resource at the past time and determines, based on the past rate change, a predicted rate of change in the amount of energy stored by the second device at a later time. Further, the controller can select the second resource based on the predicted rate of change in the amount of energy stored by the second device at the later time.

For example, the controller can receive data indicating that the second resource has 10 energy units stored and is consuming 2 energy units per hour and can receive data that a third resource has 12 energy units stored and is consuming 0.5 energy units per hour. However, based on historical power consumption/generation information, the controller can predict that the second resource will soon begin generating 2 energy units per hour. Accordingly, the controller can select the second resource because it will soon begin generating energy.

In various implementations, the controller selects the second resource based on the topology of the energy network. For example, in some embodiments, the second resource is selected based on a cost of transmitting energy to the first resource from the second resource. The cost of transmitting energy to the first resource from the second resource can include, for example, a hop count between the first resource and the second resource, a total traversal distance between the first resource at the second resource, or a transmission efficiency of transmitting energy to the first resource from the second resource.

For example, based on the topology of the energy network, the controller can determine that it would cost 1 energy unit lost due to inefficiency to transmit 10 energy units to the first resource from the second resource and determine that it would cost 2 energy units lost due to inefficiency to transmit 10 energy units to the first resource from a third resource. Accordingly, the controller can select the second resource as less energy would be lost in the transmission of energy.

In various implementations, the controller selects the second resource based on energy transmission restriction information regarding restrictions of transmitting energy between the plurality of resources. The energy transmission restriction information can indicate, for example, that various resources are limited to transmitting energy (and not receiving energy), receiving energy (and not transmitting energy), transmitting only an amount of energy it has received, transmitting energy when above a threshold energy storage level, or other functions.

For example, the controller can receive data indicating that the second resource has 5 energy units stored and is consuming 1 energy unit per hour and can receive data indicating that a third resource has 8 energy units stored and is generating 1 energy unit per hour. The energy transmission restriction information can indicate that the third resource cannot transmit energy unless it has at least 10 energy units stored. Thus, the controller can select the second resource because the third resource cannot currently transmit energy. This selection can change over time, as the energy reserves in the various resources change, and as the rates of energy generation and consumption fluctuate.

In various implementations, the controller can select the second resource and a third resource to transmit energy to the first resource simultaneously. Thus, the first resource is charged more quickly. Accordingly, in some embodiments, the controller also selects a third resource of the plurality of resources to transmit energy to the first resource while the second resource transmits energy to the first resource.

At block 350, the controller sends, to the second resource, instructions to transmit energy to the first resource. In some embodiments, the controller sends, to the first resource, instructions to receive energy from the second resource. In some embodiments, the controller also sends, to a third resource, instructions to transmit energy to the first resource while the second resource transmits energy to the first resource. In some embodiments, the controller sends instructions to a fourth resource along a path between the second resource and the first resource or between the third resource and the first resource to transparently relay energy received on one of its interfaces to a second interface without using its internal storage to add or subtract to that energy level. Thus, in some embodiments, the controller sends instructions to relay energy between the first resource and the second resource without adding to or subtracting from the energy.

The controller sends the instructions to transmit energy to the first resource via a data network. Similarly, the controller receives data (e.g., the data indicative of a current amount of energy stored by the first resource at the current time in block 310) via the data network. In various implementations, the data network is at least partially coextensive with the energy network. The energy network can include links that transmit both data and energy, such as Power over Ethernet (PoE) or Universal Serial Bus (USB). Thus, in some embodiments, the controller sends the instructions to transmit energy to the first resource via the energy network. Similarly, in some embodiments, the controller receives the data indicative of the current amount of energy stored by the first resource at the current time (in block 310) via the energy network.

Figure 4:
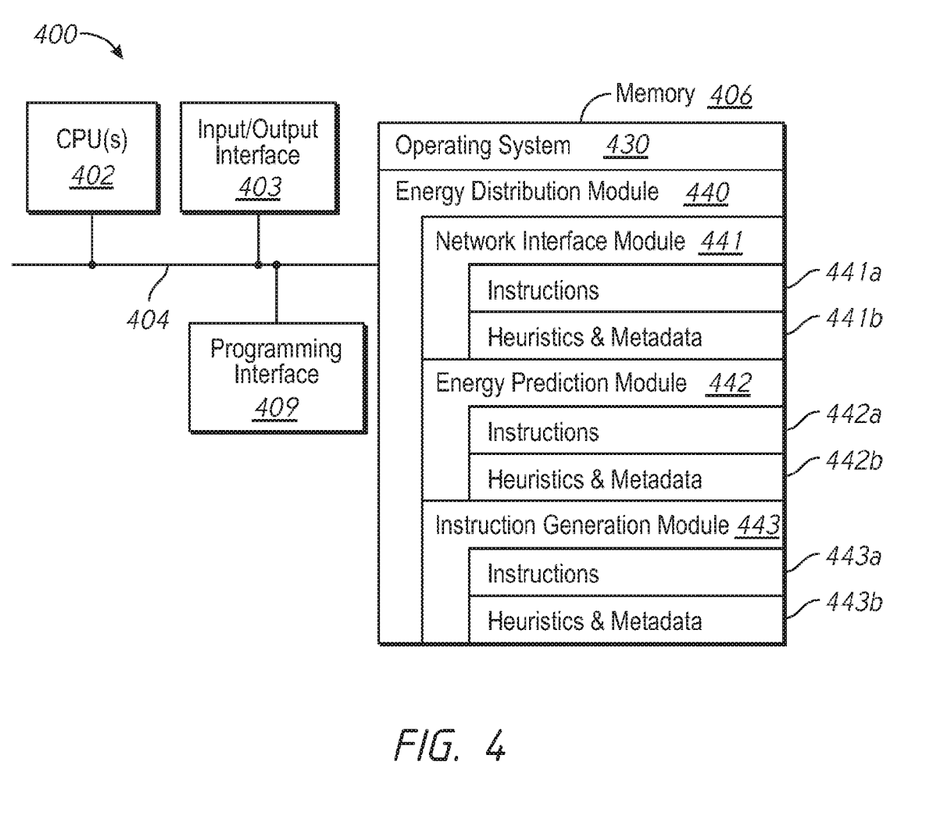
FIG. 4 is a block diagram of a computing device in accordance with some implementations.

FIG. 4 is a block diagram of a computing device 400 in accordance with some implementations. In some implementations, the computing device 400 corresponds to at least a portion of the controller 190 of FIG. 1 performs one or more of the functionalities described above with respect to the controller 190. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 400 includes one or more processing units (CPU's) 402 (e.g., processors), one or more input/output interfaces 403 (e.g., a network interface and/or a sensor interface), a memory 406, a programming interface 409, and one or more communication buses 404 for interconnecting these and various other components.

In some implementations, the communication buses 404 include circuitry that interconnects and controls communications between system components. The memory 406 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406 comprises a non-transitory computer readable storage medium. Moreover, in some implementations, the memory 406 or the non-transitory computer readable storage medium of the memory 406 stores the following programs, modules and data structures, or a subset thereof including an optional operating system 430 and energy distribution module 440. In some implementations, one or more instructions are included in a combination of logic and non-transitory memory. The operating system 430 includes procedures for handling various basic system services and for performing hardware dependent tasks. In some implementations, the energy distribution module 440 is configured to generate and send instructions to a resource to transmit energy to another resource. To that end, the energy distribution module 440 includes a network interface module 441, an energy prediction module 442, and an instruction generation module 443.

In some implementations, the network interface module 441 is configured to receive, from a first resource of a plurality of resources connected by an energy network, data indicative of a current amount of energy stored by the first resource at a current time. To that end, the network interface module 441 includes a set of instructions 441a and heuristics and metadata 441b. In some embodiments, the network interface module 441 includes router functionality, able to select which communication path or port (wired or wireless) the instructions will take via the input/output interfaces 403. In some implementations, the energy prediction module 442 is configured to determine, based on the data indicative of the current amount of energy stored by the first resource at the current time, a predicted amount of energy to be stored by the first resource at a later time. To that end, the energy prediction module 442 includes a set of instructions 442a and heuristics and metadata 442b. The set of instructions 442a can include, for example, machine-learning algorithms. The metadata 442b can include, for example, information about the historical energy consumption and generation rates, priority of the various resources, and the efficiency of the energy transmission paths between them. In some implementations, the instruction generation module 443 is configured to determine, based on the predicted amount of energy to be stored by the first resource at the later time, that the first resource is to receive energy. In some implementations, the instruction generation module 443 is further configured to select a second resource of the plurality of resources to transmit energy to the first resource. To that end, the instruction generation module 443 includes a set of instructions 443a and heuristics and metadata 443b. The instruction generation module 443 can, in some implementations, include information about restrictions for energy transmission associated with each resource, and algorithms to react to these restrictions. In some implementations, the network interface module 441 is further configured to send, to the second resource, instructions to transmit energy to the first resource.

Although the energy distribution module 440, the network interface module 441, the energy prediction module 442, and the instruction generation module 443 are illustrated as residing on a single computing device 400, it should be understood that in other embodiments, any combination of the energy distribution module 440, the network interface module 441, the energy prediction module 442, and the instruction generation module 443 can reside in separate computing devices in various implementations. For example, in some implementations each of the energy distribution module 440, the network interface module 441, the energy prediction module 442, and the instruction generation module 443 reside on a separate computing device or in the cloud.

Moreover, FIG. 4 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GPGPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    at a controller of an energy network connecting a plurality of resources, wherein each of the plurality of resources transmits and receives energy via energy links forming the energy network and transmits data to and receives data from the controller via data links forming a data network:
    receiving via the data links, information from the plurality of resources connected by the energy network, including data indicative of a current amount of energy stored by a first resource at a current time and costs of transmitting energy from the plurality of resources to the first resource at the current time;
    determining, based on the data indicative of the current amount of energy stored by the first resource at the current time, a predicted amount of energy to be stored by the first resource at a later time;
    determining, based at least in part on the predicted amount of energy to be stored by the first resource at the later time and the information from the plurality of resources connected by the energy network, that the first resource is to receive energy;
    in response to determining that the first resource is to receive energy, based on the costs of transmitting energy from the plurality of resources to the first resource at the current time, selecting a first path within the energy network to transmit energy to the first resource including selecting a second resource of the plurality of resources along the first path to transmit energy to the first resource at a specified time; and
    sending via the data links, to the second resource, instructions to transmit energy via the energy links to the first resource along the first path at the specified time.

2. The method of claim 1, further comprising receiving, from the first resource, data indicative of a current rate of change in the amount of energy stored by the first resource, wherein the predicted amount of energy to be stored by the first resource at the later time is based on the data indicative of the current rate of change in the amount of energy stored by the first resource.

3. The method of claim 1, further comprising:
    receiving, from the first resource, data indicative of a past rate of change in the amount of energy stored by the first resource at a past time; and
    determining a predicted rate of change in the amount of energy stored by the first resource at a later time based on the data indicative of the past rate of change in the amount of energy stored by the first resource,
    wherein determining the predicted amount of energy to be stored by the first resource is based on the predicted rate of change in the amount of energy stored by the first resource.

4. The method of claim 3, wherein determining the predicted rate of change includes applying a machine-learning algorithm to at least the past rate of change in the amount of energy stored by the first resource at the past time.

5. The method of claim 1, further comprising receiving, from the second resource, data indicative of a current amount of energy stored by the second resource at the current time, wherein the second resource is selected based on the data indicative of the current amount of energy stored by the second resource at the current time.

6. The method of claim 5, wherein the current amount of energy stored by the second resource at the current time is less than the current amount of energy stored by the first resource at the current time.

7. The method of claim 1, wherein determining that the first resource is to receive energy is further based on a first priority value associated with the first resource.

8. The method of claim 1, wherein the second resource is selected based on a topology of the energy network.

9. The method of claim 1, wherein a cost of transmitting energy to the first resource from the second resource includes at least one of a hop count of the energy links between the first resource and the second resource, a total traversal distance of the energy links between the first resource and the second resource, or a transmission efficiency of transmitting energy to the first resource from the second resource via the energy links.

10. The method of claim 1, wherein the second resource is selected based on energy transmission restriction information regarding restrictions on transmitting energy between the plurality of resources.

11. The method of claim 1, further comprising:
    in response to determining that the first resource is to receive energy, selecting a third resource of the plurality of resources along a second path within the energy links that is different from the first path to transmit energy to the first resource while the second resource transmits energy to the first resource; and
    sending via the data links, to the third resource, instructions to transmit energy via the energy links to the first resource along the second path while the second resource transmits energy via the energy links to the first resource along the first path.

12. The method of claim 1, further comprising sending, to a third resource of the plurality of resources, instructions to relay energy between the first resource and the second resource without adding to or subtracting from the energy.

13. The method of claim 1, wherein the energy network and the data network overlaps, and the data indicative of a current amount of energy stored by the first resource at a current time is received via the energy network and the instructions to transmit energy to the first resource are sent via the energy network.

14. A system comprising:
one or more processors;
a controller of an energy network connecting a plurality of resources, wherein each of the plurality of resources transmits and receives energy via energy links forming the energy network and transmits data to and receives data from the controller via data links forming a data network; and
a non-transitory memory comprising instructions that when executed cause the one or more processors to perform operations comprising:
receiving via the data links, information from the plurality of resources connected by the energy network, including data indicative of a current amount of energy stored by a first resource at a current time and costs of transmitting energy from the plurality of resources to the first resource at the current time;
determining, based on the data indicative of the current amount of energy stored by the first resource at the current time, a predicted amount of energy to be stored by the first resource at a later time;
determining, based at least in part on the predicted amount of energy to be stored by the first resource at the later time and the information from the plurality of resources connected by the energy network, that the first resource is to receive energy;
in response to determining that the first resource is to receive energy, based on the costs of transmitting energy from the plurality of resources to the first resource at the current time, selecting a first path within the energy network to transmit energy to the first resource including selecting a second resource of the plurality of resources along the first path to transmit energy to the first resource at a specified time; and
sending via the data links, to the second resource, instructions to transmit energy via the energy links to the first resource along the first path at the specified time.

15. The system of claim 14, wherein the operations further comprise receiving, from the first resource, data indicative of a current rate of change in the amount of energy stored by the first resource, wherein the predicted amount of energy to be stored by the first resource at the later time is based on the data indicative of the current rate of change in the amount of energy stored by the first resource.

16. The system of claim 14, wherein the operations further comprise:
receiving, from the first resource, data indicative of a past rate of change in the amount of energy stored by the first resource at a past time; and
determining a predicted rate of change in the amount of energy stored by the first resource at a later time based on the data indicative of the past rate of change in the amount of energy stored by the first resource,
wherein determining the predicted amount of energy to be stored by the first resource is based on the predicted rate of change in the amount of energy stored by the first resource.

17. The system of claim 14, wherein the second resource is selected based on a topology of the energy network.

18. The system of claim 14, wherein the energy network and the data network overlaps, and the data indicative of a current amount of energy stored by the first resource at a current time is received via the energy network and the instructions to transmit energy to the first resource are sent via the energy network.

19. A system comprising:
a controller of an energy network connecting a plurality of resources, wherein each of the plurality of resources transmits and receives energy via energy links forming the energy network and transmits data to and receives data from the controller via data links forming a data network; and
a network interface connected to the controller configured to receive via the data links, information from the plurality of resources connected by the energy network, including data indicative of a current amount of energy stored by a first resource at a current time and costs of transmitting energy from the plurality of resources to the first resource at the current time, and to send via the data links, to a second resource of the plurality of resources, instructions to transmit energy via the energy links to the first resource along the first path at a specified time;
means for generating the instructions to transmit energy to the first resource based on a predicted amount of energy to be stored by the first resource at a later time, wherein the means for generating the instructions includes:
means for determining, based on the data indicative of the current amount of energy stored by the first resource at the current time, the predicted amount of energy to be stored by the first resource at a later time;
means for determining, based at least in part on the predicted amount of energy to be stored by the first resource at the later time and the information from the plurality of resources connected by the energy network, that the first resource is to receive energy; and
means for selecting a first path within the energy network to transmit energy to the first resource including selecting the second resource of the plurality of resources along the first path to transmit energy to the first resource at the specified time.

20. The method of claim 1, wherein the instructions to transmit energy via the energy links to the first resource along the first path at the specified time includes instructions to retain a portion of the energy by the second resource.

* * * * *

UNITED STATES PATENT AND TRADEMARK OFFICE
CERTIFICATE OF CORRECTION

PATENT NO. : 10,274,984 B2
APPLICATION NO. : 15/351777
DATED : April 30, 2019
INVENTOR(S) : Yeneneh Gobena et al.

It is certified that error appears in the above-identified patent and that said Letters Patent is hereby corrected as shown below:

In the Specification

In Column 2, Line 52, please amend as shown:
101$a$-101$o$ that can transmit and receive energy via a num- In Column 2, Line 60, please amend as shown:
energy over light beams. The resources 101$a$-101$o$ can also In Column 3, Line 2, please amend as shown:
provide power to the resources 101$a$-101$o$ over time and, In Column 3, Line 6, please amend as shown:
201 can represent any of the resources 101$a$-101$o$ of FIG. 1.

In Column 3, Line 53, please amend as shown:
resources 101$a$-101$o$ to distribute energy among the energy

In Column 3, Line 56, please amend as shown:
e.g., via the data network, to various resources 101$a$-101$o$ to In Column 3, Line 61, please amend as shown:
resources 101$a$-101$o$ the source resource is to transmit In Column 4, Line 13, please amend as shown:
tributes energy among the resources 101$a$-101$o$ to minimize In Column 4, Line 14, please amend as shown:
the number of energy consuming resources 101$a$-101$o$ with- Signed and Sealed this
Thirtieth Day of June, 2020

Andrei Iancu
*Director of the United States Patent and Trademark Office*

CERTIFICATE OF CORRECTION (continued)
U.S. Pat. No. 10,274,984 B2

In Column 4, Line 16, please amend as shown:
of as many resources 101$a$-101$o$ as possible for as long as In Column 4, Line 23, please amend as shown:
tion regarding the resources 101$a$-101$o$ and the power In Column 7, Line 33, please amend as shown:
instruct the resource 101$o$ to transmit energy amounting to